United States Patent Office 3,538,121
Patented Nov. 3, 1970

3,538,121
ISOCYANATES
Edward George Gazzard and James Nairn Greenshields, Manchester, England, assignors to Imperial Chemical Industries Limited, London, England, a corporation of Great Britain
No Drawing. Filed July 7, 1967, Ser. No. 651,661
Claims priority, application Great Britain, July 8, 1966, 30,818/66
Int. Cl. C07d 7/10
U.S. Cl. 260—345.8     4 Claims

ABSTRACT OF THE DISCLOSURE

Preparation of 2 - isocyanatomethyl - 3,4 - dihydro-2H-pyran and 2,5-alkyl homologues by reaction of corresponding amine with phosgene and removal of hydrogen chloride with an acid acceptor.

Adducts of said isocyanates, polymers thereof and polymers containing regenerated isocyanate groups. Dimers and trimers of said isocyanates and products of addition of cyanic acid to said isocyanates.

---

The present invention relates to novel isocyanates containing the dihydropyran ring structure and to methods for manufacturing such isocyanates and to derivatives of such isocyanates.

Thus according to the present invention there are provided isoocyanates of the general Formula I

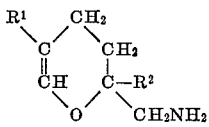

(I)

wherein $R^1$ and $R^2$ represent hydrogen atoms, lower alkyl radicals containing from 1 to 4 carbon atoms or halogen atoms.

Examples of $R^1$ and $R^2$ in the above general Formula I include hydrogen, methyl, ethyl, propyl, isopropyl and butyl radicals and chlorine.

$R^1$ and $R^2$ may represent the same or different radicals or atoms in a single compound of the general Formula I.

Examples of specific isocyanates of the general Formula I include 2-isocyanatomethyl-3,4-dihydro-2H-pyran, 2-isocyanatomethyl-2,5-dimethyl-3,4-dihydro-2H-pyran, 2 - isocyanatomethyl-5-methyl-3,4-dihydro-2H-pyran and 2-isocyanatomethyl-2,5-dichloro-3,4-dihydro-2H-pyran.

It has been found that isocyanates of the general Formula I may be made from the corresponding amines, for example 2-aminomethyl-3,4-dihydro-2H-pyran, by reacting the amine with phosgene to give the corresponding carbamyl chloride and decomposing the carbamyl chloride with an acid acceptor to give the isocyanate.

The sequence of reactions is illustrated below with respect to 2-aminomethyl-3,4-dihydro-2H-pyran as the starting material.

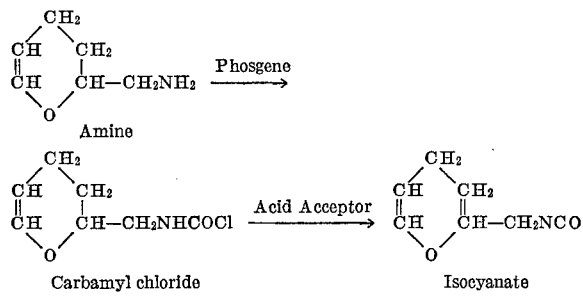

The standard method of preparing isocyanates, i.e. phosgenation cold followed by heating has not been found satisfactory for the preparation of isocyanates of the present invention as polymerisation takes place at the double bond of the pyran ring in the presence of acid, for example in the presence of hydrogen chloride liberated during phosgenation.

Thus according to a further feature of the present invention there is provided a process for the manufacture of isocyanates of the general Formula I which comprises reacting an amine of the general formula

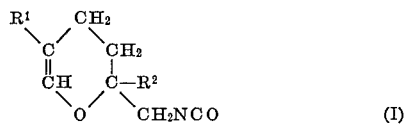

with phosgene and removing the hydrogen chloride formed by the use of an acid acceptor.

The present process may be carried out in two stages, by reacting the amine with phosgene to give the carbamyl chloride and then treating with an acid acceptor or in one stage by carrying out the whole reaction in the presence of an acid acceptor so that the hydrogen chloride is removed as formed.

Examples of acid acceptors for use in the present process include both organic and inorganic bases capable of reacting with hydrogen chloride, specific examples include calcium oxide, magnesium oxide and tertiary amines such as triethylamine, trimethylamine, tributylamine and pyridine. Mixtures of acid acceptors may be used.

The present process is normally carried out in a solvent at a temperature below 100° C. The isocyanate is conveniently isolated by distillation under reduced pressure.

The isocyanates of the present invention possess the normal properties of organic isocyanates in that they react with compounds containing active hydrogen atoms to give urethanes. They are particularly valuable isocyanates in that in addition to the isocyanate group which is capable of reaction with active hydrogen compounds they contain a vinyl ether group in the dihydropyran ring which is capable of vinyl polymerisation.

Thus subjection of the vinyl ether group to ionic vinyl polymerisation leads to the linking together of several molecules through the unsaturated vinyl ether group to give a polymer containing the unit

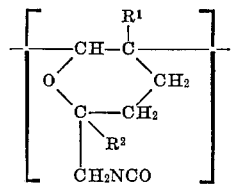

having pendant isocyanate groups capable of cross-linking reactions. Similarly copolymers may be prepared by copolymerisation with other vinyl ethers such as methyl vinyl ether.

Reaction of the isocyanates of the present invention with compounds containing active hydrogen atoms gives adducts or urethanes containing a vinyl ether group in the dihydropyran ring.

Particular adducts which have proved useful are those prepared by reaction of the isocyanates of the present invention with hydroxylic compounds.

Thus according to a further feature of the present invention there are provided adducts of the general formula:

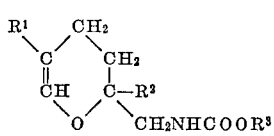

wherein R¹ and R² are as hereinbefore defined and R³ is the residue of a hydroxylic compound R³OH.

Examples of hydroxylic compounds R³OH include alcohols and phenols, for example methyl alcohol, ethyl alcohol, propyl alcohol and higher members of the aliphatic alocohol series, benzyl alcohol, phenol, cresols, chlorophenols, nitrophenols and xylenols.

The above adducts may be prepared by heating the isocyanate with the hydroxylic compound, a basic catalyst being used to accelerate the reaction if desired.

The adducts may be polymerized through the vinyl ether group present in the dihydropyran ring to give polymeric compounds containing the unit

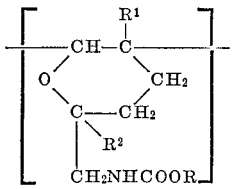

by treatment with catalysts capable of polymerising vinyl ethers. Such catalysts may be acidic or non-acidic, the acidic catalysts including both strong proton donating acids and Lewis acids, for example hydrochloric acid, boron trifluoride, aluminium chloride, ferric chloride, perchloric acid, and iodine.

Compounds obtained by polymerisation of the adducts through the vinyl ether group may be converted to polymeric compounds containing free isocyanate groups by heating to split the adduct. It is well known that adducts of isocyanates and hydroxylic compounds regenerate the parent isocyanate group on heating. This procedure gives rise to polymeric compounds containing pendant isocyanate groups and is illustrated by the following scheme.

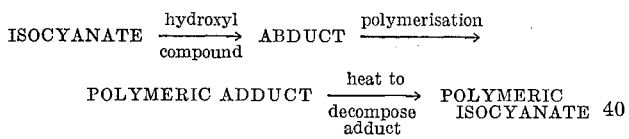

The phenolic adducts are particularly useful in this respect because of the ease with which the phenolic compound can be split off and the isocyanate group regenerated.

It is thus possible to prepare polyfunctional isocyanates useful for the production of polyurethanes.

The isocyanates of the present invention may also be polymerised to isocyanate dimers and trimers of the formula

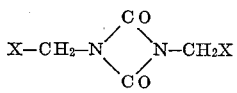

and

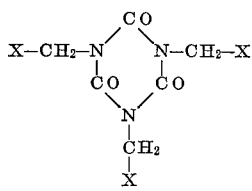

where X represents the dihydropyranyl moiety still containing the reactive vinyl ether group in the dihydropyran ring.

Trimers of the isocyanates of the present invention have an isocyanurate ring structure and may be prepared by treatment of the isocyanates with basic catalysts such as are well known for the preparation of isocyanurate polymers of isocyanates generally.

Suitable basic catalysts include tertiary amines and metal salts such as potassium acetate or the calcium, lead and manganese salts of aliphatic or alicyclic acids.

The trimers have three reactive vinyl ether double bonds and may be further polymerised or used as cross-linking agents in vinyl polymer systems.

Diisocyanates may also be made from the isocyanates of the present invention by the addition of cyanic acid across the double bond in the dihydropyran ring, for example diisocyanates such as

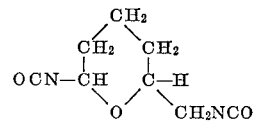

The invention is illustrated but not limited by the following examples in which all parts and percentages are by weight except where otherwise stated.

EXAMPLE 1

Preparation of 2-isocyanatomethyl-3,4-dihydro-2H-pyran

A solution of 22.6 parts of 2-aminomethyl-3,4-dihydro-2H-pyran in 200 parts by volume of dry toluene is added over a period of 60 minutes to a stirred solution of 39.6 parts of phosgene in 50 parts by volume of toluene, maintained at 0 to 10° C. A white precipitate is formed. The mixture is stirred at 40° C. for 50 minutes, whilst loss of phosgene is prevented by a water cooled condenser surmounted by a cold finger condenser containing an acetone/solid carbon dioxide mixture. Nitrogen is passed through the mixture whilst stirring at 40° C. for a further 90 minutes. The temperature is then allowed to fall to room temperature and the stirring and nitrogen flow continued for a further 16 hours. 25 parts of calcium oxide are added and stirring continued for a further 24 hours. The mixture is then filtered and 45 parts by volume of triethylamine are added to the filtrate which is then heated at 60° C. for 2 hours and then allowed to stand at room temperature for 16 hours. The white precipitate formed is filtered off and the filtrate distilled in vacuum. After removal of the toluene two fractions are collected. Fraction 1 is 1.4 parts of a liquid boiling at 78–79° C. at 11 mm. Hg $n_D^{25}=1.4723$. Fraction 2 is 1.6 parts of a liquid fraction boiling at 79° C. at 11 mm. Hg $n_D^{25}=1.4706$, equivalent weight calculated=139, found=146. This latter fraction was confirmed by infrared and nuclear magnetic resonance spectroscopy as

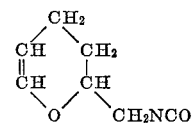

The equivalent weight is determined by reaction of the isocyanate with an excess of di-n-butylamine and back titration of the excess with a standard acid solution.

EXAMPLE 2

Preparation of the phenol adduct of 2-isocyanatomethyl-3,4 - dihydro - 2H-pyran. [Phenyl N-(3,4-dihydro-2H-pyran-2-methyl) carbamate]

4.7 parts phenol and 0.02 part triethylamine dissolved in 43.5 parts dry toluene are stirred, at room temperature, and there is added slowly 6.95 parts 2-isocyanatomethyl-3,4-dihydro-2H-pyran. The resultant mixture is heated under gentle reflux for 20 hours. A removed sample reacted with diisobutylamine and subsequently titrated with standard acid shows the absence of free isocyanate group. A further sample reacted with iodine-methanol solution for 10 minutes and subsequently titrated with standard thiosulphate indicates the presence of some 92% of vinyl ether unsaturation for the expected phenyl carbamate product.

Removal of the solvent under water pump vacuum and rapid distillation of the residue under high vacuum gives 5.1 parts of a fraction B.P. 146–8° C./0.3 mm. Hg.

This fraction possessed the infrared and nuclear magnetic resonance spectra expected for phenyl N-(3,4-dihydro-2H-pyran-2-methyl) carbamate.

EXAMPLE 3

Preparation of the phenol adduct of 2-isocyanatomethyl-3,4-dihydro-2H-pyran, polymerisation thereof via the dihydropyran vinyl ether group and finally removal of the phenol residue to give a polyfunctional isocyanate 43.5 parts dry toluene, 4.7 parts phenol, 0.02 part triethylamine and 6.95 parts 2-isocyanatomethyl-3:4-dihydro-2H-pyran are mixed and heated under reflux for 20 hours as Example 1 above, to form a toluene solution of phenyl N-(3,4-dihydro-2H-pyran-2-methyl) carbamate. This solution is heated under water pump vacuum to remove 13 parts toluene.

The residual solution is cooled and a further 13 parts dry toluene are added. At a temperature of 12° C. there is added a solution of 0.068 part boron trifluoride etherate dissolved in 7.1 parts dry diethylether. The resultant mixture is stirred at room temperature for 18 hours and there is added a further 0.7 part of a solution of 0.612 part boron trifluoride etherate dissolved in 7.1 parts dry diethyl ether. The solution is again stirred, at room temperature for 18 hours when a further 1.4 parts of the same catalyst solution is added. The mixture is stirred at room temperature for 3 days. A sample of the solution shows no vinyl ether unsaturation. To the stirred solution is added 0.094 part ammonia solution (S.G. 0.880). The solution is filtered and the filtered solution is evaporated, under water vacuum, to remove solvent.

The viscous residue (the polymerised phenol adduct) is heated, over 4 hours, under a vacuum of 0.2 mm. Hg to a bath temperature of 190° C. when 4.4 parts of distillate containing phenol distills. The distillation residue is a solid, soluble in acetone and toluene, and showing the presence of free isosyanate groups by reaction with diisobutylamine and subsequent titration with standard acid. Infrared absorption of the residue shows the product to be a polymerised dihydropyran derivative containing pendant isocyanate groups.

EXAMPLE 4

Preparation of the phenol adduct of 2-isocyanatomethyl-3,4-dihydro-2H-pyran and the polymerisation thereof via the dihydropyran vinyl ether group 6.95 parts 2 - isocyanatomethyl-3,4-dihydro-2H-pyran dissolved in 17.3 parts toluene is added to a stirred mixture of 4.7 parts phenol, 17.3 parts toluene and 4.3 parts sodium bicarbonate. The mixture is stirred at room temperature for 20 hours and is heated to reflux temperature for a period of 45 hours. A sample reacted with diisobutylamine and subsequently titrated with standard acid indicates 74% reaction of the isocyanate group. The reaction mixture is cooled and is filtered. Toluene is distilled off under water pump vacuum to leave 8.6 parts residue. This residue possesses an infrared spectrum showing strong bands due to urethane linkages (3,300, 1,720, 1,538 and 1,200 cm.$^{-1}$) dihydropyran rings (1,640 cm.$^{-1}$) phenyl rings (1,580, 690 and 760 cm.$^{-1}$) and some isocyanate groups (2,300 cm.$^{-1}$). The residue is distilled under high vacuum to give 4.0 parts of a fraction B.P. 128–132° C./0.5 mm. Hg which consists of phenyl N-(3,4-dihydro-2H-pyran-2-methyl) carbamate with a minor amount of 2-isocyanatomethyl-3,4-dihydro-2H-pyran.

2.61 parts of this fraction is dissolved with stirring in in 8.7 parts toluene and there is added 0.02 part boron trifluoride etherate dissolved in 7.1 parts diethyl ether. The mixture is stirred at room temperature for 48 hours and there is then added 8.7 parts toluene and 0.04 part boron trifluoride etherate dissolved in 7.1 parts diethyl ether. The mixture is stirred at room temperature for 18 hours, is filtered and the solvent is distilled under water pump vacuum to give 2.1 parts residue. The residue is partially dissolved in ether, filtered and the ether is evaporated to give 1.3 parts viscous liquid residue.

The infrared spectrum of this residue shows no significant absorptions for isocyanate or dihydropyran rings and the major absorptions are consistent with the product being essentially a poly (phenyl N-tetrahydropyran-2-methylcarbamate).

EXAMPLE 5

Preparation of the methyl alcohol adduct of 2-isocyanatomethyl-3,4-dihydro-2H-pyran. [Methyl N-(3,4-dihydro-2H-pyran-2-methyl) carbamate]

1.35 parts 2 - isocyanatomethyl-3,4-dihydro-2H-pyran dissolved in 3.6 parts dry diethyl ether are added, with stirring, to 0.32 part methanol and 3.6 parts diethyl ether containing 0.84 part sodium bicarbonate suspended therein. The reaction mixture is heated to reflux for 5 minutes and is allowed to cool and to stand at room temperature for 66 hours. A sample, reacted with diisobutylamine and subsequently titrated with standard acid, showed some 74% of the isocyanate unreacted. 0.1 part triethylamine is added to the reaction mixture and the mixture is heated to reflux for 7 hours. A removed sample, treated as above, showed some 36% of the isocyanate unreacted. 0.32 part of methanol is added to the reaction mixture which is heated then, under reflux, for 18 hours. A removed sample shows *no* free isocyanate. The reaction mixture is filtered and solvent is removed under water pump vacuum to leave 0.5 part residue. This residue shows infrared absorption as expected for methyl N-(3,4-dihydro-2H-pyran-2-methyl) carbamate.

EXAMPLE 6

Preparation of the isocyanurate trimer of 2-isocyanatomethyl-3,4-dihydro-2H-pyran 4.5 parts 2-isocyanatomethyl-3,4-dihydro-2H-pyran, 44.1 parts butyl acetate and 0.01 part potassium acetate, are stirred and are heated to reflux for 20 hours. A further 0.1 part potassium acetate is added and the mixture is refluxed for a further 5 hours and is allowed to stand for 18 hours at room temperature. The reaction mixture is filtered and the filtered product is washed with water and is dried to give 0.7 part solid. This solid possesses an infrared spectrum consistent with the product being essentially a dihydropyran isocyanurate derivative.

EXAMPLE 7

Preparation of the isocyanurate trimer of 2-isocyanatomethyl-3,4-dihydro-2H-pyran To 5.7 parts 2-isocyanatomethyl-3,4-dihydro-2H-pyran dissolved in 4.4 parts dry toluene is added 1 part by volume of 1,3,5 tris(3 - dimethylaminopropyl) hexahydro -s - triazine. The mixture is stirred at room temperature for 1 hour, is heated on a steam bath for 1 hour, is cooled to room temperature and is stirred for 18 hours. The toluene is removed by heating under water vacuum and no 2-isocyanatomethyl-3,4-dihydro-2H-pyran distills. A brown viscous residue 5.6 parts remains and this is dissolved in 22 parts benzene and is washed with ten washes of 4 parts water. The washed benzene solution is dried over anhydrous potassium carbonate, filtered and is evaporated to dryness under water pump vacuum. The yellow viscous residue 5.1 parts by weight shows an infrared absorption with prominent bands near 1,700 and 1,460 cm.$^{-1}$ indicating isocyanurate rings and absorptions at 1,639, 1,219, 1,063 and 727 cm.$^{-1}$ indicating dihydropyran rings.

EXAMPLE 8

Preparation of the isocyanurate trimer of 2-isocyanatomethyl-3,4-dihydro-2H-pyran 6.95 parts 2 - isocyanatomethyl - 3,4-dihydro-2H-pyran —70° C. and there is added 0.08 part iodine dissolved in 26.8 parts methylene dichloride. The mixture is stirred at —70° C. for 18 hours, is warmed to room temperature and is allowed to stand for 8 days. The solvent is then evaporated under water pump vacuum to give 6.0 parts brown viscous residue. This residue possesses an infrared absorption in the region 1,700 cm.$^{-1}$ and 1,460 cm.$^{-1}$ and also 3,4-dihydro-2H-pyran absorptions indicating the presence of dihydropyran isocyanurate. The presence of some unreacted 2-isocyanatomethyl-3,4-dihydro-2H-pyran is also indicated.

EXAMPLE 9

Preparation of 2-isocyanatomethyl-6-isocyanatotetrahydropyran 46.5 parts by volume of a freshly prepared 13.9% w./v. solution of cyanic acid in dry toluene and 0.1 part of p-toluene sulphonic acid are charged to a flask with a thermometer, stirrer, dropping funnel and silica gel guard tube. The stirrer is started and the temperature reduced to 3° C. using an ice bath. A solution of 13.9 parts of 2-isocyanatomethyl-3,4-dihydro-2H-pyran in 15 parts by volume of dry toluene is then added over a period of 3 minutes. The temperature rises to 5° C. during the addition. When addition is completed the ice bath is removed and the temperature allowed to rise to room temperature. The stirrer is stopped and the reaction mixture allowed to stand for 2 days. After filtering to remove 1.1 parts of white solid, the reaction mixture is distilled giving 12.2 parts of a colourless liquid, boiling at 120–124°° C. at 13 mm. Hg. Estimation of the isocyanate groups, by reaction with di-n-butylamine and back titration with standard acid, shows that this fraction is essentially 2-isocyanatomethyl-6-isocyanatotetrahydropyran. The structure is confirmed by the infrared and nuclear magnetic resonance spectra.

We claim:
1. An isocyanate having the formula:

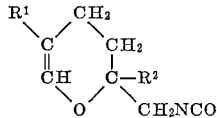

wherein R$^1$ and R$^2$ are each selected from the group consisting of hydrogen, methyl or chloro radicals.

2. An isocyanate as claimed in claim 1 wherein R$^1$ and R$^2$ represent hydrogen atoms.

3. An adduct of an isocyanate as claimed in claim 1, said adduct having the formula:

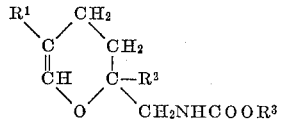

wherein R$^1$ and R$^2$ are as defined in claim 1 and R$^3$ is the residue of a monohydric alkanol or phenol having the formula R$^3$OH, said monhydric alkanol being selected from the group consisting of methyl alcohol, ethyl alcohol and propyl alcohol.

4. An adduct of an isocyanate as claimed in claim 1, said adduct having the formula

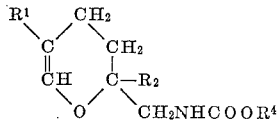

wherein R$^1$ and R$^2$ are defined in claim 1 and R$^4$ is selected from the group consisting of methyl and phenyl.

References Cited

UNITED STATES PATENTS 3,133,088   5/1964   Reinhardt _____ 260—345.8

OTHER REFERENCES

Arnold, R. G., et al.: Chemistry of Organic Isocyanates, Jackson Lab., E. I. du Pont de Nemours & Co., Wilmington, Del., HR-2, Jan. 20, 1956, pp. 3–5.

Siefkin: J. Liebigs Ann. Chemie, vol. 562 (1949), pp. 77–78.

Berichte, vol. 95 (1962), pp. 2735–41.

NORMA S. MILESTONE, Primary Examiner

U.S. Cl. X.R.

260—77.5, 248, 345.7